United States Patent
Lam et al.

(10) Patent No.: US 10,075,965 B2
(45) Date of Patent: Sep. 11, 2018

(54) APPARATUS AND METHOD FOR DETECTING AND ALLEVIATING UNFAIRNESS IN WIRELESS NETWORK

(71) Applicant: P2 Solutions Limited, New Territories (HK)

(72) Inventors: Patrick Pak Kit Lam, Kowloon (HK); Soung Chang Liew, Shatin (HK)

(73) Assignee: P2 SOLUTIONS LIMITED, New Territories (HK)

( * ) Notice: Subject to any disclaimer, the term of this patent is extended or adjusted under 35 U.S.C. 154(b) by 116 days.

(21) Appl. No.: 15/092,455

(22) Filed: Apr. 6, 2016

(65) Prior Publication Data

US 2017/0295587 A1    Oct. 12, 2017

(51) Int. Cl.
| | | |
|---|---|---|
| *H04W 72/10* | (2009.01) | |
| *H04B 7/14* | (2006.01) | |
| *H04L 12/26* | (2006.01) | |
| *H04L 5/00* | (2006.01) | |
| *H04W 72/08* | (2009.01) | |

(52) U.S. Cl.
CPC .............. *H04W 72/10* (2013.01); *H04B 7/14* (2013.01); *H04L 5/0053* (2013.01); *H04L 43/16* (2013.01); *H04W 72/085* (2013.01)

(58) Field of Classification Search
CPC ... H04W 72/10; H04W 72/085; H04W 28/02; H04W 28/05; H04W 28/0231–28/0242; H04W 28/0263; H04W 28/0273; H04W 28/0278; H04W 28/0284; H04W 28/0285; H04W 28/0289; H04W 72/12; H04W 72/1205; H04W 72/1226; H04W 72/1231; H04W 72/1242; H04W 72/1252; H04W 28/08; H04B 7/14; H04L 5/0053; H04L 43/16; H04L 47/10; H04L 47/14; H04L 47/16; H04L 47/20–47/225; H04L 47/27; H04L 47/29; H04L 47/30; H04L 47/60–47/6295; H04L 47/12–47/127; H04L 47/24–47/2491; H04L 47/50–47/58; H04L 47/54
USPC .......................................................... 370/315
See application file for complete search history.

(56) References Cited

U.S. PATENT DOCUMENTS

| | | | |
|---|---|---|---|
| 2002/0021701 A1* | 2/2002 | Lavian ................ | H04L 47/2433 370/401 |
| 2009/0028095 A1* | 1/2009 | Kish .................. | H04W 72/1242 370/328 |
| 2010/0135233 A1* | 6/2010 | Ono ................... | H04W 72/1252 370/329 |
| 2012/0233349 A1* | 9/2012 | Aybay ................ | H04L 47/2441 709/234 |
| 2015/0222561 A1* | 8/2015 | Okuno ................ | H04L 47/522 370/235 |
| 2017/0005940 A1* | 1/2017 | Haegdorens ........ | H04M 11/062 |

* cited by examiner

Primary Examiner — Maharishi V Khirodhar
Assistant Examiner — Kenneth P Hunt
(74) Attorney, Agent, or Firm — Morrison & Foerster LLP (57) ABSTRACT

A network relaying device facilitates communication among a plurality of network nodes. When the network relaying device receives a data packet from a first network node, it determines whether a historical transmission rate of the first network node exceeds a threshold rate. Based on this determination, the network relaying device determines whether to associate the data packet with a first queue or a second queue for transmission to a second network node.

25 Claims, 7 Drawing Sheets

APPARATUS AND METHOD FOR DETECTING AND ALLEVIATING UNFAIRNESS IN WIRELESS NETWORK

BACKGROUND

1. Field

The present disclosure relates to wireless networks.

2. Description of Related Art

A wireless network is built using network relaying devices such as wireless routers and wireless access points ("AP"), among other possible components. These network relaying devices facilitate communication among various network nodes of the wireless network. For example, a network relaying device relays data packets among client devices (e.g., desktop, laptop, tablet, phone, and/or customer premise equipment) and server devices (e.g., web servers).

BRIEF SUMMARY

In some embodiments, a computer-enabled method for facilitating communication among a plurality of network nodes of a network comprises: at a network relaying device in communication with a first network node and a second network node of the plurality of network nodes: receiving a data packet from the first network node; determining whether a historical transmission rate of the first network node exceeds a first threshold rate; in accordance with a determination that the historical transmission rate of the first network node does not exceed the first threshold rate, associating the data packet with a first queue for transmission to the second network node; in accordance with a determination that the historical transmission rate of the first network node exceeds the first threshold rate, associating the data packet with a second queue for transmission to the second network node; and transmitting data packets associated with the first queue at a higher priority than data packets associated with the second queue.

In some embodiments, a computer-enabled method for facilitating communication among a plurality of network nodes comprises: at a network relaying device in communication with a first network node and a second network node of the plurality of network nodes: receiving a data packet from the second network node; determining whether a historical transmission rate of the first network node exceeds a first threshold rate; in accordance with a determination that the historical transmission rate of the first network node does not exceed the first threshold rate, associating the data packet with a first queue for transmission to the first network node; in accordance with a determination that the historical transmission rate of the first network node exceeds the first threshold rate, associating the data packet with a second queue for transmission to the first network node; and transmitting data packets associated with the first queue at a higher priority than data packets associated with the second queue.

In some embodiments, a non-transitory computer-readable storage medium has computer-executable instructions, wherein the computer-executable instructions comprises instructions for facilitating communication between a first network node and a second network node of a plurality of network nodes of a network: receiving a data packet from the first network node; determining whether a historical transmission rate of the first network node exceeds a first threshold rate; in accordance with a determination that the historical transmission rate of the first network node does not exceed the first threshold rate, associating the data packet with a first queue for transmission to the second network node; in accordance with a determination that the historical transmission rate of the first network node exceeds the first threshold rate, associating the data packet with a second queue for transmission to the second network node; and transmitting data packets associated with the first queue at a higher priority than data packets associated with the second queue.

In some embodiments, a non-transitory computer-readable storage medium has computer-executable instructions, wherein the computer-executable instructions comprises instructions for facilitating communication between a first network node and a second network node of a plurality of network nodes of a network: receiving a data packet from the second network node; determining whether a historical transmission rate of the first network node exceeds a first threshold rate; in accordance with a determination that the historical transmission rate of the first network node does not exceed the first threshold rate, associating the data packet with a first queue for transmission to the first network node; in accordance with a determination that the historical transmission rate of the first network node exceeds the first threshold rate, associating the data packet with a second queue for transmission to the first network node; and transmitting data packets associated with the first queue at a higher priority than data packets associated with the second queue.

In some embodiments, a network relaying device for facilitating communication between a first network node and a second network node of a plurality of network nodes of a network comprises: one or more processors; a memory coupled to the one or more processors; and one or more programs, wherein the one or more programs are stored in the memory and configured to be executed by the one or more processors, the one or more programs including instructions for: receiving a data packet from the first network node; determining whether a historical transmission rate of the first network node exceeds a first threshold rate; in accordance with a determination that the historical transmission rate of the first network node does not exceed the first threshold rate, associating the data packet with a first queue for transmission to the second network node; in accordance with a determination that the historical transmission rate of the first network node exceeds the first threshold rate, associating the data packet with a second queue for transmission to the second network node of the plurality of network nodes; and transmitting data packets associated with the first queue at a higher priority than data packets associated with the second queue.

In some embodiments, a network relaying device for facilitating communication between a first network node and a second network node of a plurality of network nodes of a network comprises: one or more processors; a memory coupled to the one or more processors; and one or more programs, wherein the one or more programs are stored in the memory and configured to be executed by the one or more processors, the one or more programs including instructions for: receiving a data packet from the second network node of a plurality of network nodes; determining whether a historical transmission rate of the first network node of the plurality of network nodes exceeds a first threshold rate; in accordance with a determination that the historical transmission rate of the first network node does not exceed the first threshold rate, associating the data packet with a first queue for transmission to the first network node; in accordance with a determination that the historical transmission rate of the first network node exceeds the first threshold rate, associating the data packet with a second queue for transmission to the first network node; and transmitting data packets associated with the first queue at a higher priority than data packets associated with the second queue.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

The following description uses words "first," "second," etc. to distinguish one element from another. A first network node could be termed a second network node, and, similarly, a second network node could be termed a first network node, without departing from the scope of the various described embodiments. The first network node and the second network node are both network nodes, but they are not the same network node.

Figure 1:
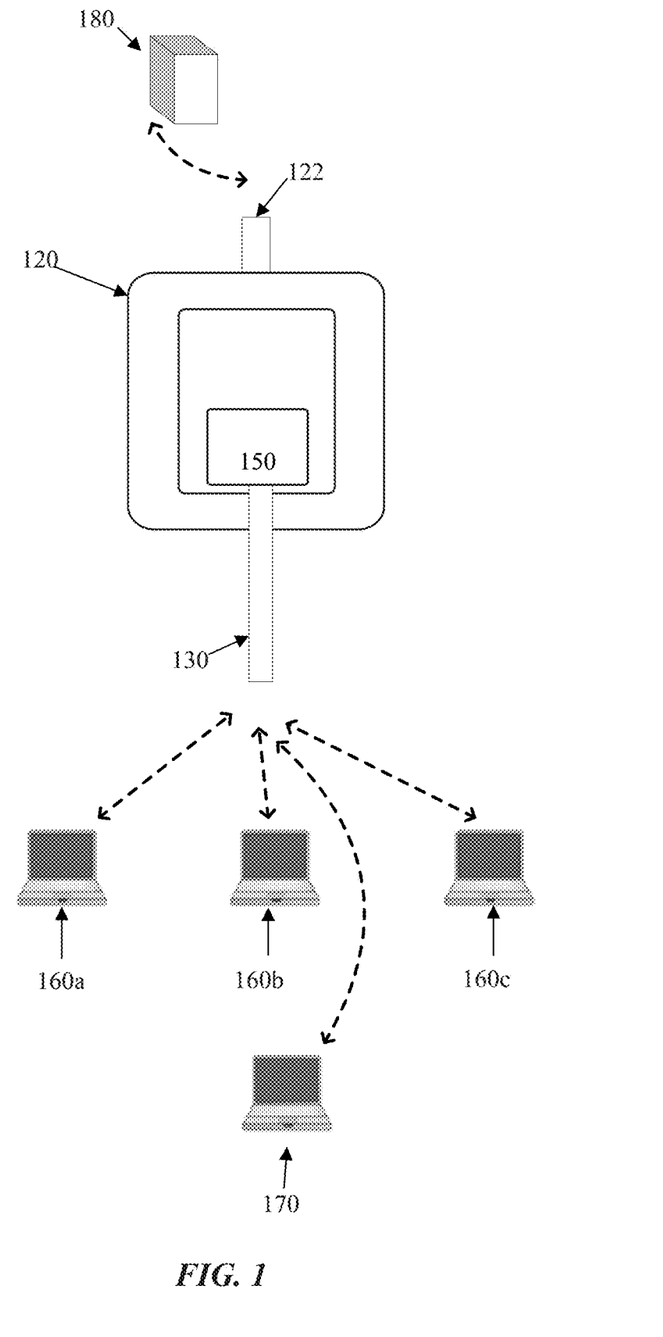
FIG. 1 depicts an exemplary wireless network comprising an exemplary network relaying device.

FIG. 1 illustrates exemplary network relaying device 120 and network nodes including client device 160a, client device 160b, client device 160c, client device 170, and server device 180. Network relaying device 120 communicates wirelessly with the client devices via radio 150 connected with antenna 130. In some instances, network relaying device 120 is a wireless router. In some instances, network relaying device 120 is a wireless access point. Network relaying device 120 also includes WAN interface 122 for communication with one or more other network nodes on a wide area network (e.g., server device 180), such as web servers on the Internet. As such, network relaying device 120 relays data packets between server device 180 and client devices 160a, 160b, 160c, and 170.

The ability of different network nodes to communicate with a network relaying device in a wireless network can vary due to variations in signal transmission paths, transmission strengths, interferences, and so forth. For example, if network node A is physically located farther from a network relaying device while network node B is physically located closer to the network relaying device, the transmission of a data packet sent by network node A is susceptible to more interferences and/or noises than the transmission of a data packet sent by network node B. These interferences and/or noises can be caused by, for example, intermediate network nodes, physical objects in the transmission path, and environment conditions (e.g., weather). As another example, if network node A is located in the basement of a building, which is surrounded by solid concrete walls, while network node B is located on the open rooftop of the same building, signals of network node A may be weaker than those of network node B due to obstacles between the two network nodes.

Due to one or more of the above-described variations, if two network nodes send the same number of data packets to a network relaying device, the network relaying device may nevertheless receive more data packets from one of the network nodes as compared to the other (e.g., the network relaying device may receive all data packets from the closer network node but may not receive all data packets from the farther network node). Alternatively, the network relaying device may receive all data packets from one of the network nodes in a shorter time frame than is required to receive all data packets from the other network node. Similarly, when the network relaying device sends the same number of data packets to the two network nodes, one network node may receive more data packets than the other network node within a specific time frame. This phenomenon may be referred to as data transmission unfairness.

Figure 2A:
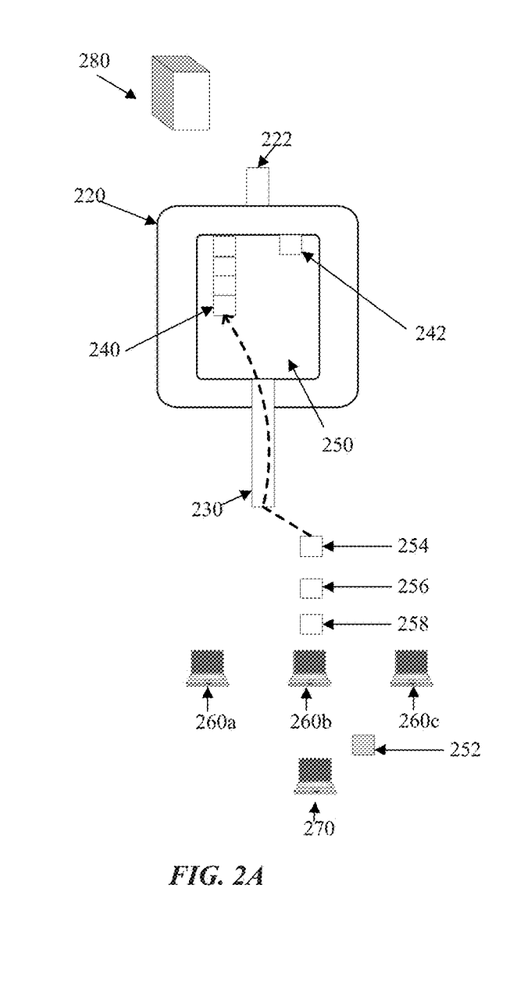
FIGS. 2A and 2B depict an exemplary network relaying device in accordance with some embodiments.
Figure 2B:
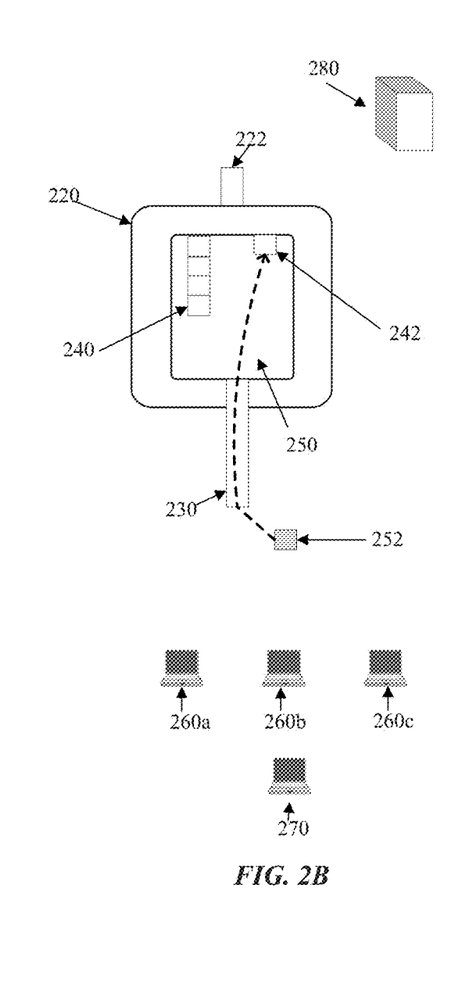

Techniques for improving fairness of network relaying device 120 with respect to its communication with client devices 160a, 160b, 160c, and 170 in some embodiments are now discussed with respect to FIGS. 2A and 2B. FIG. 2A depicts network relaying device 220, client devices 260a, 260b, 260c, and 270, and server device 280. In some examples, client device 270 is client device 170 of FIG. 1, server device 280 is server device 180 of FIG. 1, network relaying device 220 is network relaying device 120 of FIG. 1, and WAN interface 222 is WAN interface 122 of FIG. 1.

As shown, network relaying device 220 receives data packets 254, 256, 258, and 252 sent by client devices 260a, 260b, 260c, and 270, respectively, via a radio connected with antenna 230. Network relaying device 220 in turn relays the data packets to one or more server devices (e.g., server device 280) via WAN interface 222.

As discussed above, unfairness in data transmission may occur in wireless networks. As shown, client device 270 is physically located farther from network relaying device 220 while client devices 260a-c, in comparison, are physically located closer to network relaying device 220. As such, if client device 270 and client device 260a send the same number of data packets to network relaying device 220 within a designated time frame, network relaying device 220 would likely receive more packets from client device 260a because some packets of client device 270 would be interfered by the intermediate client devices 260a-c (and all other devices in front of client device 270) or interfered by environmental factors (e.g. weather) and physical objects present along the transmission path. The packets from client device 270 are more susceptible to such interferences and noise because of their relative weaker signal strengths. In some instances, unfairness in date transmission occurs due to the different peripheral conditions of the client devices 270 and 260a-c rather than their relative distances to network relaying device 220. If client device 270 is located in the basement of a building (surrounded by concrete solid walls), signals of client device 270 may be weaker than signals of client device 260a located on the rooftop of the building (an open area). In this example, network relaying device 220 may receive fewer packets from client device 270 even if client devices 270 and 260a send the same number of packets to network relaying device 220 within a designated time frame.

In other words, as a result of data transmission unfairness, network relaying device 220 perceives client device 270 as a less frequent user of the network, and client devices 260a-c as more frequent users of the network.

To improve network fairness, network relaying device 220 prioritizes transmission of data packets from less frequent users over data packets from more frequent users of the network. As shown in FIG. 2B, network relaying device 220 receives data packet 252 from client device 270. To determine the priority of data packet 252, network relaying device refers to an historical outgoing transmission rate associated with client device 270. Calculation of a network node's historical outgoing transmission rate, which is a metric related to the outgoing traffic of the network node, is described in more details below. As shown, network relaying device 220 determines that client device 270's historical outgoing transmission rate does not exceed an outgoing threshold rate. As such, network relaying device 220 determines that client device 270 is a less frequent user of the network. Based on this determination, network relaying device 220 associates data packet 252 with high-priority outgoing queue 242.

Turning back to FIG. 2A, network relaying device 220 receives data packet 254 from client device 260a. To determine the priority of data packet 254, network relaying device 220 refers to an historical outgoing transmission rate associated with client device 260a. As shown, network relaying device 220 determines that client device 260a's historical outgoing transmission rate exceeds an outgoing threshold rate. As such, network relaying device 220 determines that client device 260a is a more frequent user of the wireless network. Based on this determination, network relaying network associates data packet 254 with normal outgoing queue 240.

Network relaying device 220 transmits data packets associated with high-priority outgoing queue 242 at a higher priority than data packets associated with normal outgoing queue 240. Network relaying device 220 can use various mechanisms to transmit data packets at different priorities. In some instances, network relaying device 220 transmits the data packets associated with high-priority outgoing queue 242 at a higher effective transmission rate than the data packets associated with normal outgoing queue 240. For example, networking relaying device 220 transmits all of the data packets associated with high-priority outgoing queue 242 before transmitting a data packet associated with normal outgoing queue 240. As another example, network relaying device 220 transmits X number of data packets associated with high-priority outgoing queue 242 while transmitting Y number of data packets associated with normal outgoing queue 240 in a specific time frame, where X is a higher number than Y.

After transmitting a data packet, network relaying device 220 may receive an acknowledgement packet ("ACK") acknowledging the receipt of the data packet. After transmitting a data packet, network relaying device 220 disassociates the data packet from the corresponding queue, for example, after receiving an ACK acknowledging the receipt of the data packet.

Network relaying device 220 may send an ACK to a network node after receiving a data packet from the network node. In some instances, the historical outgoing transmission rate of a network node is calculated based on the number of ACKs sent by the network relaying device to the network node in a specific time frame. For example, if nine (9) ACKs have been sent to client device 270 from network relaying device 220 over the preceding 100 milliseconds ("ms"), the historical outgoing transmission rate of client device is thus calculated as 9 ACKs/100 ms. If the outgoing threshold rate is 10 ACKs/100 ms, network relaying device 220 would determine that client device 270 is a less frequent user of the network. In some instances, the historical outgoing transmission rate of a network node is determined based on the number of ACKs received by the network node from the network relaying device in a specific time frame.

In some instances, the time frame used to calculate the historical outgoing transmission rate of a network node shifts forward in time as the network relaying device continues to receive data packets from the network node. As such, the priority of one data packet from a network node can be different from the priority of another data packet from the same network node. This way, the network relaying device avoids continuing to prioritize data packets from a network node after the unfairness issue with respect to the network node has been sufficiently mitigated.

In some instances, the outgoing threshold rate varies across different wireless networks. For example, an outgoing threshold rate associated with a LTE network is different from an outgoing threshold rate associated with a Wi-Fi network. In some instances, the outgoing threshold rate varies across different wireless networking standards (e.g., 802.11 standards). In some instances, the outgoing threshold rates are pre-determined.

In some instances, network relaying device 220 avoids giving undue priority to a network node that suffers from low throughput not because of unfairness factors (as described herein), but because of its poor wireless channels. A network node may have a poor wireless channel for any number of reasons. For example, if the network node is out of range or transmitting at a low power, the wireless channels for the network node may be poor, which prevents transmission to or reception from the network relaying device. In these scenarios, giving priority to the network node would not necessarily benefit the network node, and would in fact cause harm to other network nodes in the network.

In some instances, network relaying device 220 determines a quality of an outgoing wireless channel associated with a network node and handles data packets from the network node accordingly based on the result of the determination. For example, the wireless channel quality may be determined based on a historical transmission rate (e.g., the historical transmission rate is 0 or very low).

In some instances, network relaying device 220 detects that the historical outgoing transmission rate of a network node is abnormally low (e.g., 0), and accordingly treats the network node as an abnormally infrequent user of the network. Data packets from abnormally infrequent users are associated with the normal transmission queue. For example, if network relaying device 220 determines that the historical outgoing transmission rate of client device 270 is 0 ACKs/ms, network relaying device 220 determines that client device 270 is an abnormally infrequent user (as of the time when the determination is made), and thus associates data packet 252 with normal outgoing queue 240. This way, data packet 252 is not transmitted at a higher priority. This determination may occur at the initial/boot-up stage of network relaying device 220 (which is aware of the existence of client device 270 before the determination). With this technique, the high-priority outgoing queue is less likely to become overloaded, especially in embodiments where the network relaying device is configured to keep re-transmitting a data packet that fails to be transmitted.

In some instances, the identification of a network node as an abnormally infrequent user is not performed every time the network relaying device receives a data packet from the network node. For example, at the time of the network relaying device or the network node boots up, the network relaying device, which is aware of the network node, examines the historical outgoing transmission rate to determine whether the network node is an abnormally infrequent user. If so, the network relaying device will associate all data packets from the network node with the normal outgoing queue for a certain period of time. In some instances, the identification of a network node as an abnormally infrequent user is performed based on the signal strength of the network node. In some instances, when the network node is determined to be an abnormally infrequent user, the network relaying device suspends outgoing communication with the network node altogether.

Figure 3A:
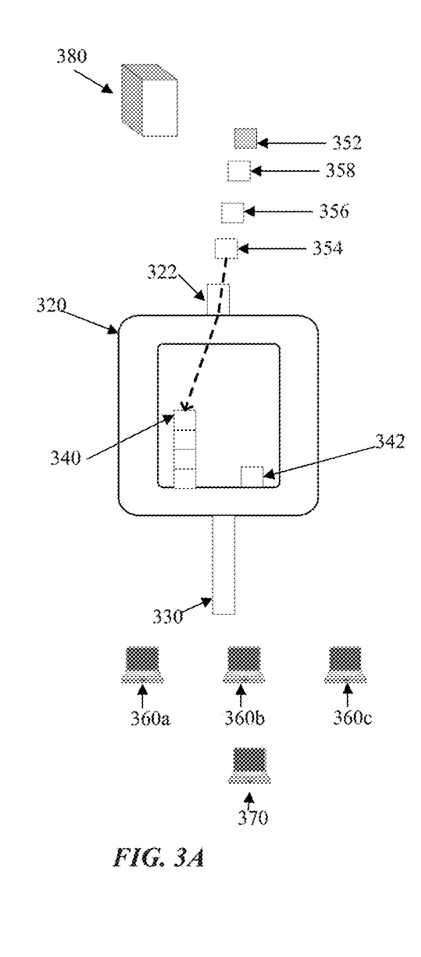
FIGS. 3A and 3B depict an exemplary network relaying device in accordance with some embodiments.
Figure 3B:
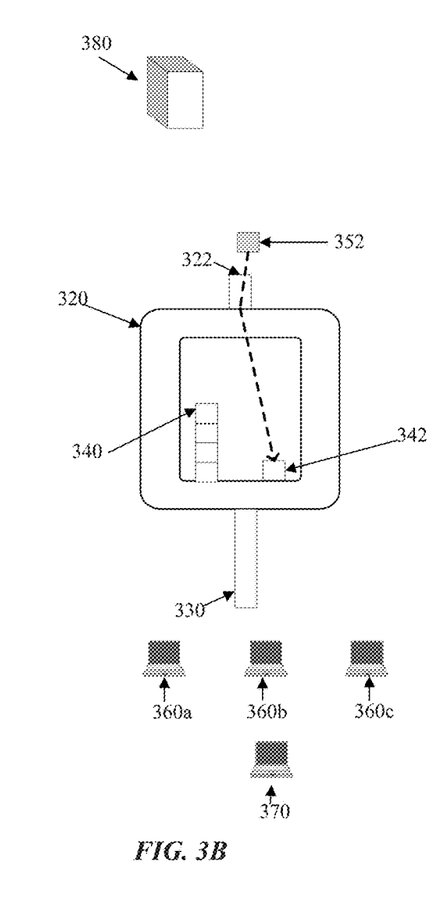

Techniques for improving fairness in some embodiments are discussed with respect to FIGS. 3A and 3B. FIG. 3A depicts network relaying device 320, client devices 360a, 360b, 360c, and 370, and server device 380. In some examples, client device 370 is client device 170 of FIG. 1, server device 380 is server device 180 of FIG. 1, network relaying device 320 is network relaying device 120 of FIG. 1, and WAN interface 322 is WAN interface 122 of FIG. 1.

In this depicted example, network relaying device 320 receives data packets sent by one or more server devices (e.g., server device 380) via WAN interface 322, and relays the data packets to the client devices via a radio connected with antenna 330. As shown, data packets 354, 356, and 358 are to be relayed to client devices 360a, 360b, and 360c, respectively; data packet 352 is to be relayed to client device 370. In some instances, network relaying device 320 determines where the data packet is to be relayed based on the Media Access Control address of the packet. In some instances, network relaying device 320 determines where the data packet is to be relayed based on the Internet Protocol address of the packet.

In this exemplary embodiment, network relaying device 320 prioritizes transmission of data packets to be relayed to less frequent users over data packets to be relayed to more frequent users of the network. As shown in FIG. 3B, network relaying device 320 receives data packet 352 to be relayed to client device 370. To determine the priority of data packet 352, network relaying device refers to a historical incoming transmission rate associated with client device 370. Calculation of a network node's historical incoming transmission rate, which is a metric related to the incoming traffic of the network node, is described in more details below. As shown, network relaying device 320 determines that client device 370's historical incoming transmission rate does not exceed an incoming threshold rate. As such, network relaying device 320 determines that client device 370 is a less frequent user of the network, and thus associates data packet 352 with high-priority incoming queue 342.

Turning back to FIG. 3A, network relaying device 320 receives data packet 354 to be relayed to client device 360a. To determine the priority of data packet 354, network relaying device refers to an historical incoming transmission rate associated with client device 360a. As shown, network relaying device 320 determines that client device 360a's historical incoming transmission rate exceeds an incoming threshold rate. As such, network relaying device 320 determines that client device 360a is a more frequent user of the network, and associates data packet 354 with normal incoming queue 340.

Network relaying device 320 transmits data packets associated with high-priority incoming queue 342 at a higher priority than data packets associated with normal incoming queue 340. Examples of transmitting data packets associated with one queue at a higher priority than data packets associated with another queue are provided above with reference to high-priority outgoing queue 242 and normal outgoing queue 240 (FIGS. 2A and 2B). One of ordinary skill in the art would recognize that similar techniques can be applied to high-priority incoming queue 342 and normal incoming queue 340.

After transmitting a data packet, network relaying device 320 receives an ACK acknowledging the receipt of the data packet. For example, network relaying device 320 receives an ACK from client device 370 acknowledging the receipt of data packet 352. After transmitting a data packet, network relaying device 220 disassociates the data packet from the corresponding queue, for example, after receiving an ACK for the data packet.

In some instances, the historical incoming transmission rate of a network node, which can be used to determine whether the network node is a less frequent user of a network, is calculated based on the number of ACKs received by the network relaying device from the network node in a specific time frame. For example, if eight (8) ACKs have been received from client device 370 by network relaying device 320 over the preceding 100 milliseconds ("ms"), the historical incoming transmission rate of the client device is thus calculated as 8 ACKs/100 ms. If the incoming threshold rate is 12 ACKs/100 ms, network relaying device 320 would determine that client device 370 is a less frequent user of the network.

In some instances, the time frame used to calculate the historical incoming transmission rate of a network node shifts forward in time as the network relaying device continues to receive data packets to be relayed to the network node. As such, the priority of one data packet to be relayed to the network node can be different from the priority of another data packet to be relayed to the network node. This way, the network relaying device avoids continuing to prioritize data packets to be relayed to a network node after the unfairness issue with respect to the network node has been sufficiently mitigated.

In some instances, the incoming threshold rate varies across different wireless networks. For example, an incoming threshold rate associated with a LTE network is different from an incoming threshold rate associated with a Wi-Fi network. In some instances, the incoming threshold rate varies across different wireless networking standards (e.g., 802.11 standards). In some instances, the different incoming threshold rates are pre-determined. In some instances, network relaying device 320 determines a quality of an incoming wireless channel associated with a network node and handles data packets from the network node accordingly based on the result of the determination. For example, the wireless channel quality may be determined based on a historical transmission rate (e.g., the historical transmission rate is 0 or very low) or the number of times that a packet has failed to be transmitted (e.g., as indicated by the failure to receive an ACK packet).

In some instances, network relaying device 320 detects that the historical incoming transmission rate of a network node is abnormally low (e.g., 0), and accordingly treats the network node as an abnormally infrequent user of the network. Data packets from abnormally infrequent users are associated with the normal incoming queue. For example, if the network relaying device determines that the historical incoming transmission rate of client device 370 is 0, the network relaying device determines that client device 370 is an abnormally infrequent user (as of the time of the determination), and thus associates data packet 352 with normal incoming queue 340. This way, data packet 352 is not transmitted to client device 370 at a higher priority. This determination may occur at the initial/boot-up stage of network relaying device 320 (which is aware of the existence of client device 370 before the determination). With this technique, the high-priority incoming queue is less likely to become overloaded, especially in embodiments where the network relaying device is configured to keep re-transmitting a data packet that fails to be transmitted.

In some instances, the identification of a network node as an abnormally infrequent user is not performed every time the network relaying device receives a data packet to be relayed to the network node. In some instances, at the time of the network relaying device or the network node boots up, the network relaying device, which is aware of the network node, examines the historical incoming transmission rate to determine whether the network node is abnormal. If so, the network relaying device associates all data packets to be relayed to the network node with the normal incoming queue for a certain period of time. In some instances, the identification of a network node as an abnormally infrequent user is performed based on the signal strength of the network node. In some instances, when the network node is determined to be an abnormally infrequent user, the network relaying device suspends incoming communication with the network node altogether.

Figure 4:
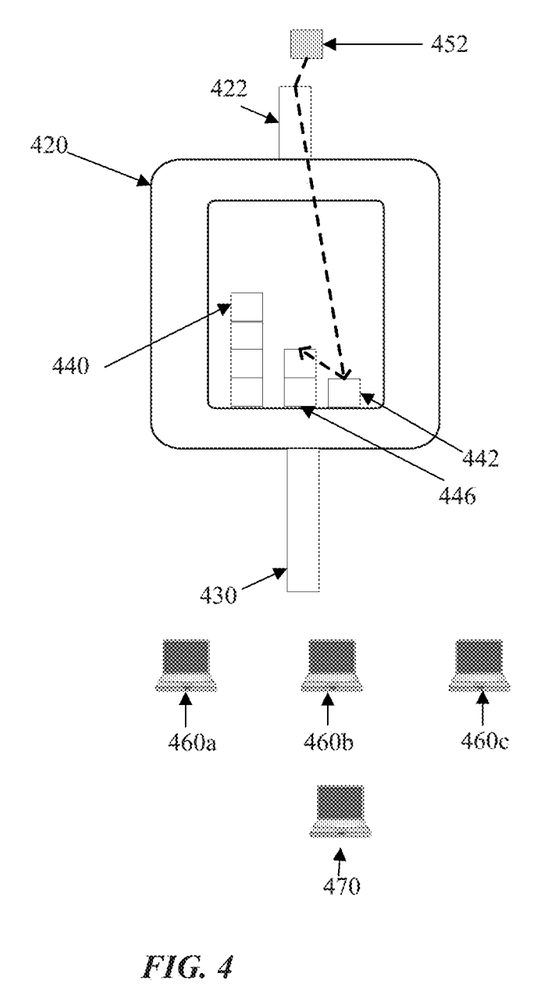
FIG. 4 depicts an exemplary network relaying device in accordance with some embodiments.

Techniques for improving fairness in some embodiments are discussed with respect to FIG. 4. FIG. 4 illustrates an exemplary scenario in which a data packet associated with a high-priority incoming queue fails to be transmitted repeatedly. One of ordinary skill in the art would recognize that repeated failure to transmit such a data packet would adversely affect the operation of the high-priority incoming queue. For example, IEEE 802.11 has a "retransmission" mechanism dictating that a data packet that has failed to be transmitted be retransmitted. Under this mechanism, the high-priority incoming queue can become easily overloaded when a packet repeatedly fails to be transmitted.

As shown, network relaying device 420 receives data packet 452, which is to be relayed to client device 470. Network relaying device determines that client device 470 is a less frequent user of the network (e.g., based on the historical incoming transmission rate of client device 470), and thus associates data packet 452 with high-priority incoming queue 442.

Network relaying device 420 attempts to transmit data packet 452 to client device 470 but fails. For example, network relaying device makes an attempt to transmit the data packet, but receives no ACK from client device 470 after a certain amount of time. Such transmission failure can occur due to abruptly worsening communication conditions. When network relaying device 420 detects a transmission failure of data packet 452, the network relaying device tries to transmit the data packet for a number of more times. If, however, the number of failed attempts exceeds a threshold value (e.g., 4), network relaying device 420 determines that client device 470 is temporarily unreachable, suspends the transmission of packet 452, and moves on to transmitting another data packet associated with the high-priority incoming queue.

In some instances, the network relaying device suspends the transmission of a data packet by disassociating the data packet from the high-priority incoming queue. In some instances, the network relaying device associates the data packet with a temporary suspension queue. As can be seen in FIG. 4, packet 452 is moved to temporary suspension queue 446. In some instances, the network relaying device identifies other data packets associated with high-priority incoming queue 442 that are to be relayed to client device 470, disassociates them from high-priority incoming queue 442, and associates them with temporary suspension queue 446.

Network relaying device 420 handles data packets associated with temporary suspension queue 446 (e.g. data packet 452) after handling all of the transmissible packets associated with high-priority incoming queue 442 and before returning to handling data packets associated with normal incoming queue 440. In some cases, the communication conditions between networking device 420 and client device 470 have so deteriorated that client device 470 becomes unreachable. When network relaying device 420 fails to transmit data packet 452 from temporary suspension queue 446 to client device 470 for a predefined number of times (e.g., 3), the network relaying device determines that client device 470 is unreachable. Accordingly, network relaying device 420 disassociates data packet 452 from temporary suspension queue 446 and discards the data packet. In some instances, the network relaying device also discards and disassociates all of the data packets that are to be relayed to client device 470 from temporary suspension queue 446.

Figure 5:
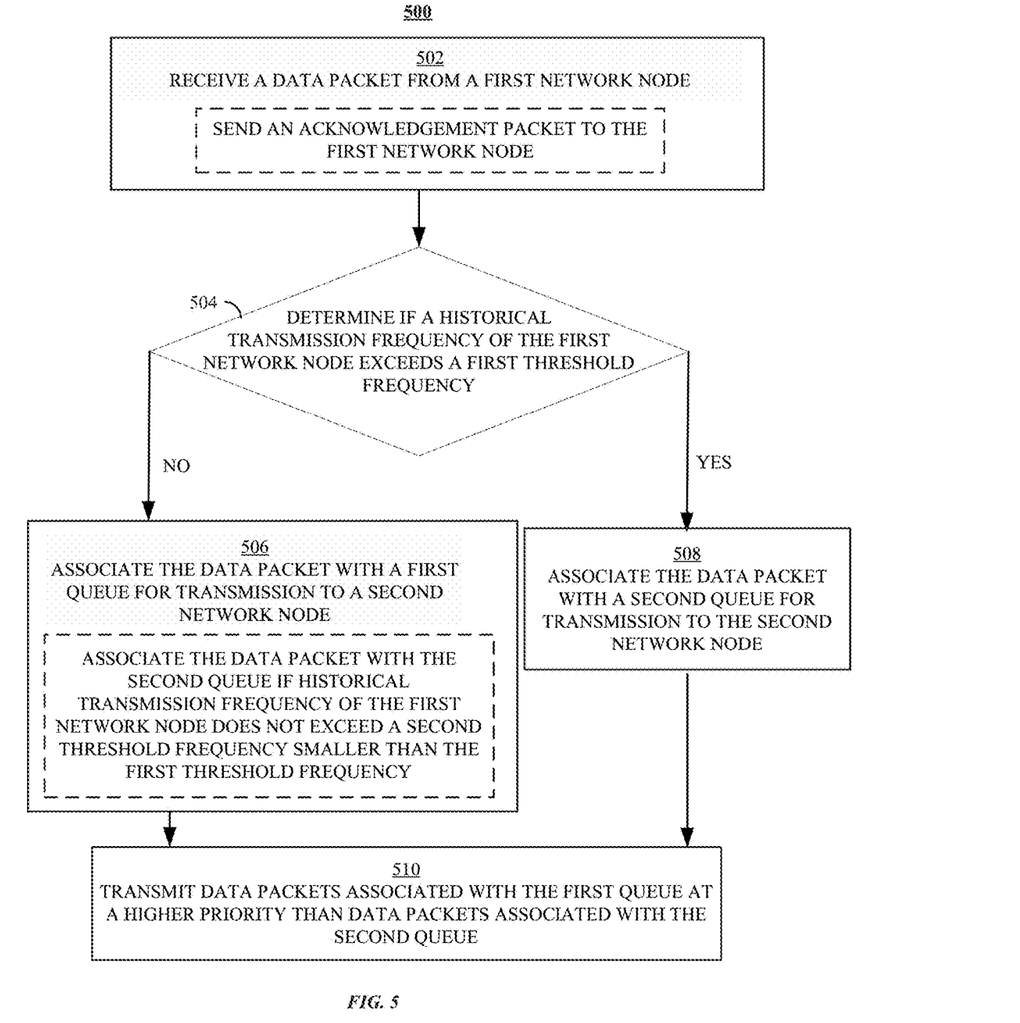
FIG. 5 is a flow diagram illustrating an exemplary process for scheduling data communication to improve fairness in wireless networks in accordance with some embodiments.

FIG. 5 illustrates exemplary process 500 for scheduling data communication to improve fairness in a wireless network according to some embodiments. Process 500 is performed by a network relaying device, such as network relaying device 220 (FIGS. 2A and 2B) in communication with a plurality of network nodes, in some examples. The network relaying device has a radio and a WAN interface component, in some examples.

At block 502, the network relaying device receives a data packet from a first network node. In some embodiments, the first network node is a client device that communicates with the network relaying device wirelessly. The network relaying device sends an ACK to the first network node to acknowledge the receipt of the data packet.

At block 504, the network relaying device determines whether a historical transmission rate of the first network node exceeds a first threshold rate. In some instances, the historical transmission rate of the first network node is calculated using techniques described above with respect to the historical outgoing transmission rate of client device 270, with reference to FIGS. 2A and 2B.

If the network relaying device determines that the historical transmission rate of the first network node does not exceed the first threshold rate, processing proceeds to block 506. At block 506, the network relaying device associates the data packet with a first queue for transmission to a second network node. An example of the first queue is high-priority outgoing queue 242 (FIGS. 2A and 2B). In some instances, the network relaying device determines whether the historical transmission rate of the first network node exceeds a second threshold rate (e.g., 0), which is lower than the first threshold rate. If it is determined that the historical transmission rate does not exceed the second threshold rate, the network relaying device associates the data packet with a second queue for transmission to the second network node.

If the network relaying device determines that the historical transmission rate of the first network node does exceed the first threshold rate, processing proceeds to block 508. At block 508, the network relaying device associates the data packet with the second queue for transmission to the second network node. An example of the second queue is normal outgoing queue 240 (FIGS. 2A and 2B).

The network relaying device transmits data packets associated with the first queue at a higher priority than data packets associated with the second queue. In some instances, the network relaying device transmits data packets associated with the first queue at a higher effective transmission rate than data packets associated with the second queue. In some instances, the network relaying device transmits all of the data packets associated with the first queue before transmitting a data packet associated with the second queue. In some instances, after transmitting a data packet, the network relaying device disassociates the data packet from the corresponding queue.

Pseudo-code representing computer processor-executable instructions usable to perform process 500 (FIG. 5) in some embodiments is provided below.

```
while (receives a packet from a first network node)
{
    check a historical outgoing transmission rate of the first network
    node;
    if (the transmission rate is higher than a second threshold rate and
lower than a first threshold rate)
    {
        associate the packet with high-priority outgoing queue;
    }
}
=== At the high-priority outgoing queue ==============
while (a packet is placed on the high-priority outgoing queue)
{
    process the packet immediately;
    disassociate the packet from the queue;
}
```

Figure 6:
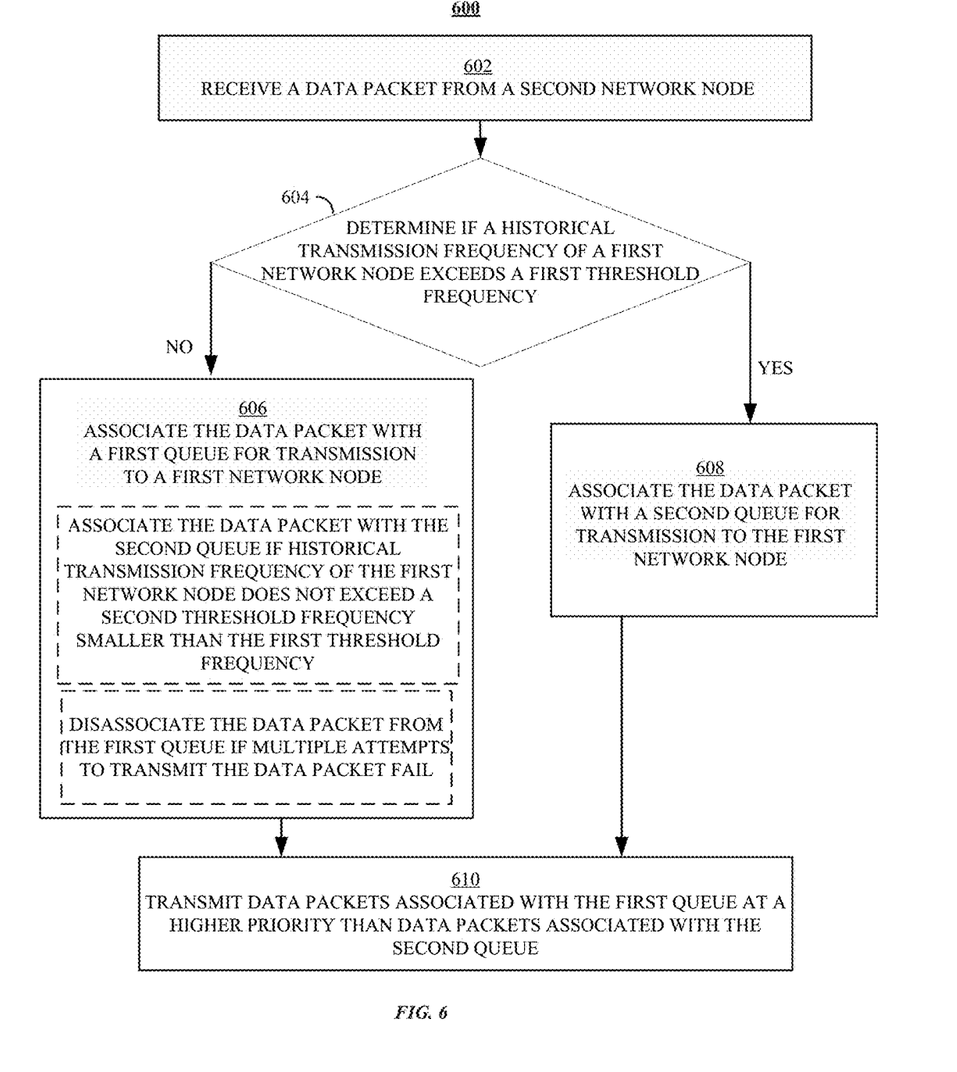
FIG. 6 is a flow diagram illustrating an exemplary process for scheduling data communication to improve fairness in wireless networks in accordance with some embodiments.

FIG. 6 illustrates exemplary process 600 for scheduling data communication to improve fairness in a wireless network according to some embodiments. Process 600 is performed by a network relaying device, such as network relaying device 320 (FIGS. 3A and 3B) in communication with a plurality of network nodes, in some examples. The network relaying device has a radio and a WAN interface component, in some examples.

At block 602, the network relaying device receives a data packet from a second network node. The data packet is to be relayed to a first network node. In some instances, the second network node is a server device that communicates with the network relaying device via a WAN interface, either via wire or wirelessly. In some instances, the first network node is a client device that communicates with the network relaying device wirelessly.

At block 604, the network relaying device determines whether a historical transmission rate of the first network node exceeds a first threshold rate. In some instances, the historical transmission rate of the first network node is calculated using techniques described above with respect to the historical incoming transmission rate of client device 370 (FIGS. 3A and 3B).

If the network relaying device determines that the historical transmission rate of the first network node does not exceed the first threshold rate, processing proceeds to block 606. At block 606, the network relaying device associates the data packet with a first queue for transmission to the first network node. An example of the first queue is high-priority incoming queue 342 (FIGS. 3A and 3B). In some instances, the network relaying device further determines whether the historical transmission rate of the first network node does not exceed a second threshold rate (e.g., 0), which is lower than the first threshold rate. If the historical transmission rate of the first network node does not exceed the second threshold rate, the network relaying device associates the data packet with a second queue for transmission to the first network node.

In some instances, the network relaying device disassociates the data packet from the first queue if attempts to transmit the data packet fail for a predetermined number of times (e.g., 4). In some instances, the network relaying device associates the data packet with a third queue. An example of the third queue is temporary suspension queue 446 (FIG. 4). In some instances, the network relaying device also identifies all other data packets to be relayed to the first network node, disassociates these data packets from the first queue, and associates these packets with the third queue. After disassociating the data packet(s) from the first queue, the network relaying device proceeds to transmitting other data packets associated with the first queue.

In some instances, the network relaying device attempts to transmit the data packets associated with the third queue, for example, after transmitting all of the transmissible packets associated with the first queue but before transmitting packets associated with the second queue. If a data packet fails to be transmitted from the third queue for a predetermined number of times (e.g., 3), the network relaying device disassociates the data packet (and in some examples other data packets to be transmitted to the same destination) from the third queue and discards the data packet.

If the network relaying device determines that the historical transmission rate of the first network node does exceed the first threshold rate, processing proceeds to block 608. At block 608, the network relaying device associates the data packet with the second queue for transmission to the first network node. An example of the second queue is normal incoming queue 340 (FIGS. 3A and 3B).

The network relaying device transmits data packets associated with the first queue at a higher priority than data packets associated with the second queue. In some instances, the network relaying device transmits data packets associated with the first queue at a higher effective transmission rate than data packets associated with the second queue. For example, the network relaying device transmits all of the data packets associated with the first queue before transmitting a data packet associated with the second queue. In some instances, after successfully transmitting a data packet to the first network node, the network relaying device receives an ACK from the first network node that acknowledges the receipt of the data packet.

Pseudo-code representing computer processor-executable instructions usable to perform process 600 (FIG. 6) in some embodiments is provided below.

```
while (a packet to be relayed to a first network node arrives)
{
    check the historical incoming transmission rate of the first network node;
    if (the transmission rate is higher than a second threshold rate and below a first threshold rate)
    {
        place the packet to high-priority incoming queue;
    }
}
=== At the high-priority incoming queue =============
while (a packet is placed on the high-priority incoming queue)
{
    process the packet immediately;
    retry_count = 0;
    while (an ACK is not received from the destination network node) && (retry_count < 4)
    {
        retry the transmission;
        retry_count++;
    }
    If (retry_count ==4) //that is, the transmission has failed for 4 times already
    {
        search the high-priority incoming transmission queue for packets to be relayed to the destination network node;
            disassociate all these packets from the high-priority incoming transmission queue;
            move all these packets to the temporally suspension queue;
    }
    Else {disassociate the packet from the high-priority incoming queue;}
}
=== At the temporary suspension queue =============
while (a packet is placed on the temporary suspension queue queue)
{
    process the packet when there is no packet in the high-priority incoming queue;
    retry_count = 0;
    while (an ACK is not received from the destination network node) && (retry_count < 3)
    {
        retry the transmission;
        retry_count++;
    }
    If (retry_count ==3) //that is, the transmission has failed for 3 times already
    {
        search the high-priority incoming queue for packets to be relayed to destination network node;
            discard all these packets;
    }
    Else {disassociate the packet from the temporary suspension queue;}
}
```

Figure 7:
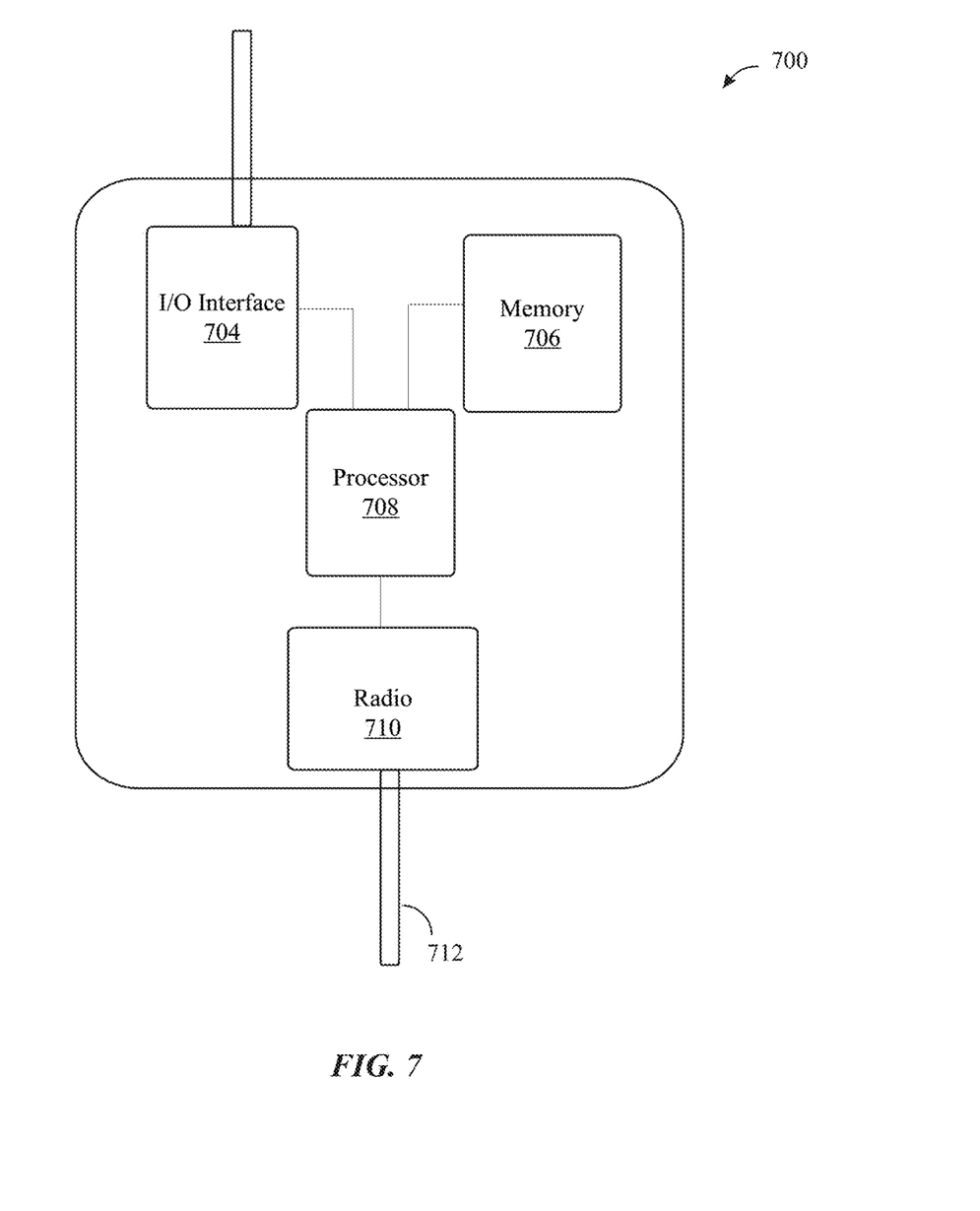
FIG. 7 is a block diagram of an exemplary network relaying device in accordance with some embodiments.

FIG. 7 depicts exemplary network relaying device 700. Network relaying device 700 represents network relaying device 120 (FIG. 1), network relaying device 220 (FIGS. 2A and 2B), network relaying device 320 (FIGS. 3A and 3B), and/or network relaying device 420 (FIG. 4) in some embodiments. Network relaying device 700 executes process 600 (FIG. 6) and/or process 500 (FIG. 5) to carry out the above-described techniques, including those described with reference to FIGS. 1-4, in some embodiments.

Network relaying device 700 has at least one radio 710, which connects to antenna 712. In some examples, radio 710 is configurable to support operation of one or more WiFi standards (e.g., IEEE 802.11a/b/g/n/ac standards). Network relaying device 700 has at least one microprocessor 708. Microprocessor 708 connects to at least one memory 706, and at least one input/output (I/O) interface 704. Memory 706 includes a non-transitory storage medium that stores instructions, such as instructions executable by microprocessor(s) 708. In some examples, the instructions are for performing processes 500 (FIG. 5) and/or 600 (FIG. 6). Network relaying device 700 can be connected to an external network or external device via I/O interface 704, which includes one or more of WAN interface, LAN interface, WiFi interface, cellular phone interface, and/or a USB port, in some examples.

It is noted that the configuration of the above-discussed network is exemplary in nature. It is possible to have, for example, a network comprising multiple network relaying devices, where each of the network relaying devices facilitates communication among a plurality of network nodes. It is also possible, for example, for a network node to act as a server device in one transmission while acting as a client device in another transmission in accordance with the descriptions of client and server devices herein.

It is further noted that the claimed technique can be applied to a point-to-multiple-points mesh environment. That is, the clients could be mesh AP's, which can be interfered by various sources from time to time. As a result, having a fairer scheduling mechanism will improve the performance of the mesh AP's and the mesh environment.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A computer-enabled method for facilitating communication among a plurality of network nodes of a network, the method comprising:
   at a network relaying device in communication with a first network node and a second network node of the plurality of network nodes:

receiving a data packet from the first network node;
determining whether a historical outgoing rate of the first network node exceeds a first threshold rate and whether the historical outgoing rate of the first network node exceeds a second threshold rate, wherein the historical outgoing rate of the first network node is based on a number of acknowledgement packets transmitted between the first network node and the network relaying device in a time period, and wherein the second threshold rate is lower than the first threshold rate;
in accordance with a determination that the historical outgoing rate of the first network node does not exceed the first threshold rate and exceeds the second threshold rate, associating the data packet with a first queue for transmission to the second network node;
in accordance with a determination that the historical outgoing rate of the first network node exceeds the first threshold rate, associating the data packet with a second queue for transmission to the second network node;
in accordance with a determination that the historical outgoing rate of the first network node does not exceed the second threshold rate, associating the data packet with the second queue for transmission to the second network node; and
transmitting data packets associated with the first queue at a higher priority than data packets associated with the second queue.

2. The method of claim 1, further comprising:
in response to receiving the data packet from the first network node, sending an acknowledgment packet to the first network node.

3. The method of claim 1, the method further comprising:
determining a number of acknowledgement packets sent by the network relaying device to the first network node in a time period,
wherein the acknowledgement packets were sent responsive to receiving data packets from the first network node, and
wherein the historical outgoing rate of the first network node comprises the determined number.

4. The method of claim 1, wherein the historical outgoing rate of the first network node comprises a number of acknowledgement packets received by the first network node from the network relaying device in a time period.

5. The method of claim 1, wherein the second threshold rate is zero.

6. The method of claim 1, further comprising:
transmitting data packets associated with the first queue at a higher effective rate than data packets associated with the second queue.

7. The method of claim 1, further comprising:
transmitting all of the data packets associated with the first queue before transmitting a data packet associated with the second queue.

8. The method of claim 1, further comprising determining a quality of a wireless channel associated with the first network node.

9. A computer-enabled method for facilitating communication among a plurality of network nodes, the method comprising:
at a network relaying device in communication with a first network node and a second network node of the plurality of network nodes:
receiving a data packet from the second network node;
determining whether a historical incoming rate of the first network node exceeds a first threshold rate and whether the historical incoming rate of the first network node exceeds a second threshold rate, wherein the historical incoming rate of the first network node is based on a number of acknowledgement packets transmitted between the first network node and the network relaying device in a time period and wherein the second threshold rate is lower than the first threshold rate;
in accordance with a determination that the historical incoming rate of the first network node does not exceed the first threshold rate and exceeds the second threshold rate, associating the data packet with a first queue for transmission to the first network node;
in accordance with a determination that the historical incoming rate of the first network node exceeds the first threshold rate, associating the data packet with a second queue for transmission to the first network node;
in accordance with a determination that the historical incoming rate of the first network node does not exceed the second threshold rate, associating the data packet with the second queue for transmission to the first network node; and
transmitting data packets associated with the first queue at a higher priority than data packets associated with the second queue.

10. The method of claim 9, further comprising:
transmitting the data packet to the first network node; and
receiving an acknowledgment packet from the first network node.

11. The method of claim 9, further comprising:
determining a number of acknowledgement packets received by the network relaying device from the first network node in a time period,
wherein the acknowledgement packets were sent by the first network node responsive to receiving data packets from the network relaying device,
wherein the historical incoming rate of the first network node comprises the determined number.

12. The method of claim 9, wherein the second threshold rate is zero.

13. The method of claim 9, further comprising:
transmitting data packets associated with the first queue at a higher effective rate than data packets associated with the second queue.

14. The method of claim 9, further comprising:
transmitting all of the data packets associated with the first queue before transmitting a data packet associated with the second queue.

15. The method of claim 9, wherein the data packet is a first data packet, further comprising:
in accordance with the determination that the historical incoming rate of the first network node does not exceed the first threshold rate and exceeds the second threshold rate:
attempting a transmission of the first data packet associated with the first queue to the first network node;
determining whether the attempted transmission of the first data packet associated with the first queue is successful;
in accordance with a determination that the attempted transmission of the first data packet associated with the first queue is not successful:

determining whether a number of unsuccessful attempted transmissions of the first data packet associated with the first queue exceeds a threshold number;
in accordance with a determination that the number of unsuccessful attempted transmissions of the first data packet associated with the first queue exceeds the threshold number:
disassociating the first data packet from the first queue; and
associating the first data packet with a third queue.

16. The method of claim 15, further comprising:
in accordance with the determination that the number of unsuccessful attempted transmissions of the first data packet associated with the first queue exceeds the threshold number:
attempting a transmission of a second data packet associated with the first queue, wherein the second data packet is different from the first data packet;
in accordance with a determination that the number of unsuccessful attempted transmissions of the first data packet associated with the first queue does not exceed the threshold number:
attempting another transmission of the first data packet associated with the first queue to the first network node.

17. The method of claim 15, further comprising:
in accordance with the determination that the number of unsuccessful attempted transmissions of the first data packet associated with the first queue exceeds the threshold number:
identifying a third data packet associated with the first queue, wherein the third data packet is to be transmitted to the first network node;
disassociating the third data packet from the first queue; and
associating the third data packet with the third queue.

18. The method of claim 15, wherein the threshold number is a first number, further comprising:
in accordance with the determination that the number of unsuccessful attempted transmissions of the first data packet associated with the first queue exceeds the first threshold number:
attempting a transmission of the first data packet associated with the third queue to the first network node;
determining whether the transmission of the first data packet associated with the third queue is successful;
in accordance with a determination that the transmission of the first data packet associated with the third queue is not successful:
determining whether a number of unsuccessful attempted transmissions of the first data packet associated with the third queue exceeds a second threshold number;
in accordance with a determination that the number of unsuccessful attempted transmissions of the first data packet associated with the third queue exceeds the second threshold number:
disassociating the first data packet from the third queue;
in accordance with a determination that the number of unsuccessful attempted transmissions of the first data packet associated with the third queue does not exceed the second threshold number:
attempting another transmission of the first data packet associated with the third queue to the first network node.

19. The method of claim 9, further comprising: determining a quality of a wireless channel associated with the first network node.

20. The method of claim 18, wherein the first threshold number is 4 and the second threshold number is 3.

21. A non-transitory computer-readable storage medium having computer-executable instructions, wherein the computer-executable instructions comprises instructions for facilitating communication between a first network node and a second network node of a plurality of network nodes of a network:
receiving a data packet from the first network node;
determining whether a historical outgoing rate of the first network node exceeds a first threshold rate and whether the historical outgoing rate of the first network node exceeds a second threshold rate, wherein the historical outgoing rate of the first network node is based on a number of acknowledgement packets transmitted between the first network node and the network relaying device in a time period and wherein the second threshold rate is lower than the first threshold rate;
in accordance with a determination that the historical outgoing rate of the first network node does not exceed the first threshold rate and exceeds the second threshold rate, associating the data packet with a first queue for transmission to the second network node;
in accordance with a determination that the historical outgoing rate of the first network node exceeds the first threshold rate, associating the data packet with a second queue for transmission to the second network node;
in accordance with a determination that the historical outgoing rate of the first network node does not exceeds the second threshold rate, associating the data package with the second queue for transmission to the second network node; and
transmitting data packets associated with the first queue at a higher priority than data packets associated with the second queue.

22. A non-transitory computer-readable storage medium having computer-executable instructions, wherein the computer-executable instructions comprises instructions for facilitating communication between a first network node and a second network node of a plurality of network nodes of a network:
receiving a data packet from the second network node;
determining whether a historical incoming rate of the first network node exceeds a first threshold rate and whether the historical incoming rate of the first network node exceeds a second threshold rate, wherein the historical incoming rate of the first network node is based on a number of acknowledgement packets transmitted between the first network node and the network relaying device in a time period and wherein the second threshold rate is lower than the first threshold rate;
in accordance with a determination that the historical incoming rate of the first network node does not exceed the first threshold rate and exceeds the second threshold rate, associating the data packet with a first queue for transmission to the first network node;
in accordance with a determination that the historical incoming rate of the first network node exceeds the first threshold rate, associating the data packet with a second queue for transmission to the first network node;
in accordance with a determination that the historical incoming rate of the first network node does not exceed the second threshold rate, associating the data packet with the second queue for transmission to the first network node; and transmitting data packets associated with the first queue at a higher priority than data packets associated with the second queue.

23. A network relaying device for facilitating communication between a first network node and a second network node of a plurality of network nodes of a network, the network relaying device comprising:
one or more processors;
a memory coupled to the one or more processors; and
one or more programs, wherein the one or more programs are stored in the memory and configured to be executed by the one or more processors, the one or more programs including instructions for:
receiving a data packet from the first network node;
determining whether a historical outgoing rate of the first network node exceeds a first threshold rate and whether the historical outgoing rate of the first network node exceeds a second threshold rate, wherein the historical outgoing rate of the first network node is based on a number of acknowledgement packets transmitted between the first network node and the network relaying device in a time period and wherein the second threshold rate is lower than the first threshold rate;
in accordance with a determination that the historical outgoing rate of the first network node does not exceed the first threshold rate and exceeds the second threshold rate, associating the data packet with a first queue for transmission to the second network node;
in accordance with a determination that the historical outgoing rate of the first network node exceeds the first threshold rate, associating the data packet with a second queue for transmission to the second network node of the plurality of network nodes;
in accordance with a determination that the historical outgoing rate of the first network node does not exceed the second threshold rate, associating the data packet with the second queue for transmission to the second network node; and
transmitting data packets associated with the first queue at a higher priority than data packets associated with the second queue.

24. A network relaying device for facilitating communication between a first network node and a second network node of a plurality of network nodes of a network, the network relaying device comprising:
one or more processors;
a memory coupled to the one or more processors; and
one or more programs, wherein the one or more programs are stored in the memory and configured to be executed by the one or more processors, the one or more programs including instructions for:
receiving a data packet from the second network node of a plurality of network nodes;
determining whether a historical incoming rate of the first network node of the plurality of network nodes exceeds a first threshold rate and whether the historical incoming rate of the first network node exceeds a second threshold rate, wherein the historical incoming rate of the first network node is based on a number of acknowledgement packets transmitted between the first network node and the network relaying device in a time period and wherein the second threshold rate is lower than the first threshold rate;
in accordance with a determination that the historical incoming rate of the first network node does not exceed the first threshold rate and exceeds the second threshold rate, associating the data packet with a first queue for transmission to the first network node;
in accordance with a determination that the historical incoming rate of the first network node exceeds the first threshold rate, associating the data packet with a second queue for transmission to the first network node;
in accordance with a determination that the historical incoming rate of the first network node does not exceeds the second threshold rate, associating the data packet with the second queue for transmission to the first network node; and
transmitting data packets associated with the first queue at a higher priority than data packets associated with the second queue.

25. The method of claim 1, wherein the historical outgoing rate of the first network node is based on a number of acknowledgement packets sent by the network relaying device to the first network node in the time period.

* * * * *